Patented Apr. 5, 1938

2,113,533

UNITED STATES PATENT OFFICE 2,113,533

RESTRAINT OF CRYSTALLIZATION OF INORGANIC COLLOIDS IN AQUEOUS ASSOCIATION

Willis A. Boughton, Cambridge, and William R. Mansfield, Boston, Mass., assignors to New England Mica Co., Waltham, Mass., a corporation of Massachusetts No Drawing. Application September 4, 1935, Serial No. 39,168

25 Claims. (Cl. 154—2.6)

This invention relates to the restraint of crystallization of inorganic colloids in aqueous association, more particularly when used as bonding agents for discrete particles of matter, by the conjoint use of crystallization restraining substances associated with the inorganic colloids, and of the application of controlled pressure and elevated temperatures to products being bonded with the inorganic colloids during the process of manufacture.

An object of the invention is to provide a process of restraining crystallization in the inorganic colloid bonding agent used to bond discrete particles of matter by the application of controlled pressures at temperatures increasing from normal to upwards of 500° C., the pressure serving to retard or prevent the elimination of water from the bonding agent, and thereby maintain the inorganic bonding compound in the colloidal state.

A further object is to provide a process of restraining crystallization in the inorganic colloid bonding agent used in the bonding of mica flakes into fabricated sheets, tubes, special shapes, etc., by subjecting the mica product being bonded to the controlled application of pressure and desired temperatures, thereby retarding or preventing the otherwise dehydration of the aqueous inorganic colloidal association used as the bonding agent.

A further object is to provide a process of bonding mica flakes by which products are produced which maintain a high electrical resistance, do not carbonize, and are mechanically durable.

Other objects of the invention will be apparent to those skilled in the art upon reading the specification.

In a search for new and useful binders for mica pieces, and other discrete particles of matter, we have recently developed a series of colloidal inorganic bonding compositions; (see, for example, U. S. Patent #2,004,030, which discloses a plurality of such colloidal substances including sodium metaphosphate, $NaPO_3$; glacial phosphoric acid, $HPO_3$; sodium monoborate, $NaBO_2$; other alkali metaphosphates and monoborates, such as the respective ammonium, lithium, and potassium compounds; also a few other chemically related compounds, also a variety of the salts of the element beryllium including beryllium sulphate which is preferably slightly basic due to the presence of a slight excess of dissolved beryllium oxide or carbonate). The more successful use of these compositions involves the incorporation of one or more crystallization restraining substances in the bonding compositions; and as one result of our earlier work, an application for U. S. patent was filed, said application disclosing the above inorganic colloidal bonding agents, and also sodium silicate, and was entitled "Method of restraining crystallization of dissolved inorganic compounds in concentrated solutions", Serial Number 546,154; filed June 22, 1931, now Patent 2,016,274, dated Oct. 8, 1935.

Our experiments of that time were made in open dishes, (i. e. not under pressure) with the commercial material then available, and yielded results that indicated so definitely a tendency to crystallize when more than ten percent of crystallization restraining material was present, that we then assumed this percentage to be the maximum operable proportion under all conditions, and that larger proportions would impair the quality of the products obtained.

In this earlier work the proportion of crystallization restraining substances was, therefore, limited to less than ten percent, as we then believed this to be the maximum operable proportion. Later work with apparently a better quality of material has shown, however, that the percentage may be greatly increased and even approach a reversal of percentages, namely ten percent of colloidal inorganic bonding substance and ninety percent of crystallization restraining material, provided that the pressure is sufficient and is applied while the temperature is being increased from about room temperature to the maximum temperature of manufacture. In other words, pressure on the colloidal binder during the manufacture of bonded products is an essential factor in the restraint of crystallization of inorganic colloid bonding materials, as well as the selected crystallization restraining salts described in the earlier application, (Serial Number 546,154, now Patent 2,016,274), and conforming to the criteria there listed. This pressure probably acts to retard or prevent the escape of the colloidally associated water, and to maintain the dissolved salts in the colloidal state. The present application for patent, therefore, deals with pressure as such an essential factor, and the relation of pressure to the proportion of crystallization restraining material that may be successfully used, rather than to the use of the crystallization restraining materials themselves in minor quantities and in the absence of appropriate pressures.

In some of the earlier work of this series, (U. S. Patents 1,975,079; and 2,004,030, for example), the effect of pressure on restraint of crystallization was noted, but as evident from these patents the work there mentioned was done at the same time as the work for the noted application (546,154, now Patent 2,016,274) on Restraint of crystallization; the application covered by Patent Number 1,975,079, and the application Serial Number 546,154, now Patent 2,016,274, being filed on the same day. These earlier references to the aid of pressure referred therefore to the concentrations of crystallization restraining material then thought to be the maximum operable, namely, under ten percent, at which crystallization was largely restrained whether or not pressure was applied. The present application refers to the use of much higher concentrations of crystallization restraining materials with which, when open heating is used, crystallization has been found to occur, but when pressure is employed while heat is applied to the product being bonded, crystallization is positively restrained, as shown in the tables given later.

As a result of the present work the properties of the fabricated products have been considerably improved, the improvements considerably enhancing their usefulness. Concentrations of crystallization restraining materials now actually employed in some products are in the neighborhood of twenty percent, and the pressures applied thereto are from about twenty-five pounds to upwards of two hundred and fifty pounds per square inch. The products are allowed to cool under pressure.

The bonded mica plates, for example, as now obtained, are much superior to those heretofore obtained, are extraordinarily clear, well integrated and adhered, permanent, of maximum dielectric strength, and high thermal resistance. Because of their better integration they may be more easily cut and punched. Molding at intermediate temperatures is more easily done. Furthermore, they permit more latitude in processes of manufacture, such as less exact temperature control and greater ease of handling in intermediate stages. Naturally, also, there is a slight economy in the cost of the colloidal constituent of the mixed binder. We believe that the improvement in physical properties is the direct result of the use of higher concentrations of crystallization restraining material made possible only by employment of such pressures during the heating process that constitute solution maintaining pressures.

The colloidal bonding substances referred to herein are alkali metal metaphosphates, and alkali metal monoborates, and are preferably limited to two, namely, sodium metaphosphate, and sodium monoborate, and which may be used singly or mixed; the bonding and other properties of these substances having been found to be highly advantageous, and their tendency to crystallize at higher temperatures being found to be markedly restrainable. We have found by experimentation that in the absence of pressure each of these substances (in its commercially available form) in colloidal aqueous condition may develop crystallization spontaneously at a temperature markedly but not greatly above the boiling point of water. The temperature at which crystallization begins is definitely increased upon incorporation of ten percent or less of crystallization restraining materials as described in the earlier application (Serial Number 546,154, now Patent 2,016,274), and shown here; but when pressure is applied and the temperature then increased, crystallization is restrained for an additional temperature increase of upwards of 150° C. in the case of sodium monoborate; and to temperatures upwards of 500° C. with sodium metaphosphate. We find, therefore, for desirable concentrations of crystallization restraining substances above about ten percent, and for intermediate temperatures at which there is still residual water in the colloidal binder, pressure sufficient to maintain the inorganic compound in the colloidal state is an essential factor in the restraint of crystallization.

As described above, the earlier work referred to concentrations of crystallization restraining substances of ten percent or less, while the present work involves the effect of pressure in restraining crystallization when higher concentrations of crystallization restraining materials are present and the full crystallization restraining effect of the added material can be utilized.

TABLE I

Crystallization temperatures of sodium metaphosphates

| NaPO₃ | Crystallization restraining material | Crystallization temperatures | |
|---|---|---|---|
| | | Open dish | Upwards of 250 pounds pressure per square inch ± about 25° C. |
| Percent | Percent | °C. | °C. |
| 100 | 0 | 120 | Below 300 |
| 91 | 9* | 315 | 370 |
| 82 | 18** | 333 | 480 |
| 66 | 34** | Above 360 | 540 |
| 59 | 41 | Above 360 | 540 |
| 19 | 81 | Above 360 | 540 |

* Potassium hydroxide.
** Potassium hydroxide and diammonium orthophosphate.

TABLE II

Corresponding results obtained with sodium monoborate

| NaBO₃ | Crystallization restraining material | Crystallization temperatures | |
|---|---|---|---|
| | | Open dish | Upwards of 250 pounds pressure per square inch ± about 25° C. |
| Percent | Percent | °C. | °C. |
| 100 | 0 | 108 | 260 |
| 90 | 10 | 114 | 315 |
| 70 | 30 | 121 | 315 |
| 50 | 50 | 135 | 315 |
| 20 | 80 | 132 | 315 |

TABLE III

Corresponding results for a mixture of two parts of sodium metaphosphate and one part of sodium monoborate—crystallization temperatures of the above mixture

| Colloidal mixture | Crystallization restraining material* | Crystallization temperatures | |
|---|---|---|---|
| | | Open dish | Upwards of 250 pounds pressure per square inch ± about 25° C. |
| Percent | Percent | °C. | °C. |
| 100 | 0 | 103 | 345 |
| 90 | 10 | 111 | 370 |
| 70 | 30 | 118 | 425 |
| 50 | 50 | 123 | 315 |
| 20 | 80 | 130 | 315 |

* Dipotassium orthophosphate.

It is evident therefore that in the restraint of crystallization of these inorganic colloids, containing larger proportions of crystallization restraining material, heating under pressure is an essential positive factor in that the inorganic compounds are thereby maintained in the colloidal state. It is our belief that this is due to the restraint of thermal dehydration physically by the applied pressure, thus maintaining the colloidality of the bonding material (upon which its bonding properties depend at temperatures below that of anhydrous fusion to a glass); and therefore the effect might perhaps equally well be called "Restraint of dehydration of inorganic colloidal binders by continued application of pressure during progressive elevation of temperature."

This matter of dehydration and loss of colloidal adhesive condition is one that is not even now wholly clear, involving as it does, properties and conditions not subject to the usual methods of study. But we believe as a result of our work over many years that, and as previously stated, adhesive colloidality in these inorganic materials at temperatures below that of complete dehydration is intrinsically associated with the retention of at least small proportions of water. If this water is lost, or enters into ordinary chemical combination, crystallization ensues and adhesiveness is lost. Sodium metaphosphate appears to hold its colloidal water more strongly than sodium monoborate, which explains the lower value for the crystallization temperature of the latter substance both, alone, and in the 33⅓ percent mixture of said sodium monoborate with sodium metaphosphate.

For actual commercial production the pressure used varies from 150 to about 215 pounds per square inch. The effect of restraint of crystallization has, however, been followed from pressures as low as about 25 pounds per square inch to as high as 1000 pounds per square inch; that is, pressure on either the high or the low side of those employed commercially functions to restrain crystallization of these bonding materials.

Thus it must be recognized that pressure alone is one of the primary factors in the restraint of crystallization; and is of equal importance to the selection of added crystallization restraining materials corresponding to the criteria given in the application Serial No. 546,154, now Patent 2,016,274. Pressure in practically any degree above normal appears to function in this way.

The crystallization restraining substances mentioned in the tables, namely, potassium hydroxide, and diammonium and dipotassium orthophosphate, are not the only ones that might be used to give similar effects. The criteria for selection of such substances are given in the earlier application Serial No. 546,154, now Patent 2,016,274. Among possible substitutes for the substances given above, therefore, are potassium carbonate, disodium orthophosphate, or a mixture of potassium carbonate, disodium orthophosphate, or a mixture of potassium carbonate and orthophosphoric acid.

We claim—

1. The method of cementing discrete pieces to produce built-up products, which comprises bonding said pieces into a preliminary built-up assembly with a bonding agent which is prepared by incorporating in a viscous colloidal aqueous association of a dissolved inorganic salt having the property of bonding said pieces and of spontaneously developing crystallization at increasingly elevated temperatures, from about ten percent to about ninety percent by weight of the bonding agent of a compatible compound having the property of restraining crystal development in said viscous colloidal association, and thereafter effecting the final bonding by subjecting the said built-up assembly to increasingly elevated temperatures until a desired degree of dehydration of the aqueous colloidal bonding agent has been attained and simultaneously to pressure sufficient to maintain the said bonding agent in a colloidal state, and cooling the finally bonded product while under pressure.

2. The method according to claim 1, in which the assembly, during the final bonding operation, is subjected simultaneously to controlled pressures from moderate pressures to upwards of about 250 pounds per square inch, and to controlled heat of from about 100° C. to upwards of about 500° C.

3. The method according to claim 1, in which the assembly, during the final bonding operation, is subjected simultaneously to controlled pressures from about 150 pounds per square inch to about 215 pounds per square inch, and to controlled heat of from about 160° C. to about 170° C.

4. The method of cementing discrete pieces to produce built-up products, which comprises bonding said pieces into a preliminary built-up assembly with a bonding agent which is prepared by incorporating in a viscous colloidal aqueous association of at least one dissolved inorganic salt selected from a group consisting of alkali metal metaphosphate, and alkali metal monoborate, the said association having the property of bonding said pieces and of spontaneously developing crystallization at increasingly elevated temperatures, from about ten percent to about ninety percent by weight of the bonding agent of a compatible compound having the property of restraining crystal development in said viscous colloidal association, and thereafter effecting the final bonding by subjecting the said built-up assembly to increasingly elevated temperatures until a desired degree of dehydration of the aqueous colloidal bonding agent has been attained and simultaneously to pressure sufficient to maintain the said bonding agent in a colloidal state, and cooling the finally bonded product while under pressure.

5. The method according to claim 4, in which the inorganic salts in said group are sodium salts, and in which the assembly, during the final bonding operation, is subjected simultaneously to controlled pressures from moderate pressures to upwards of about 250 pounds per square inch, and to controlled heat of from about 100° C. to upwards of about 500° C.

6. The method according to claim 4, in which the inorganic salts in said group are sodium salts, and in which the assembly, during the final bonding operation, is subjected simultaneously to controlled pressures of from about 150 pounds per square inch, to about 215 pounds per square inch, and to controlled heat of from about 160° C. to about 170° C.

7. The method of cementing discrete pieces to product built-up products, which comprises bonding said pieces into a preliminary built-up assembly with a bonding agent which is prepared by incorporating in a viscous colloidal aqueous association of at least one dissolved inorganic salt selected from a first group consisting of alkali metal metaphosphate, and alkali metal monoborate, the said association having the property of bonding said pieces and of spontaneously developing crystallization at increasingly elevated temperatures, from about ten percent to about ninety percent by weight of the bonding agent of at least one compatible compound selected from a second group consisting of potassium hydroxide, diammonium orthophosphate, and dipotassium orthophosphate, said compound having the property of restraining crystal development in said viscous colloidal association, and thereafter effecting the final bonding by subjecting the said built-up assembly to increasingly elevated temperatures until a desired degree of dehydration of the aqueous colloidal bonding agent has been attained and simultaneously to pressure sufficient to maintain the said bonding agent in a colloidal state, and cooling the finally bonded product while under pressure.

8. The method according to claim 7, in which the inorganic salts in said first group are sodium salts, and in which the assembly, during the final bonding operation, is subjected simultaneously to controlled pressures from moderate pressures to upwards of about 250 pounds per square inch, and to controlled heat of from about 100° C. to upwards of about 500° C.

9. The method according to claim 7, in which the inorganic salts in said first group are sodium salts, and in which the assembly, during the final bonding operation, is subjected simultaneously to controlled pressures of from about 150 pounds per square inch, to about 215 pounds per square inch, and to controlled heat of from about 160° C. to about 170° C.

10. The method acording to claim 7, in which the inorganic salts selected from the first group are in the proportion of two parts of sodium metaphosphate and one part of sodium monoborate, and one part of an orthophosphate selected from the second group.

11. The method according to claim 7, in which the inorganic salts selected from the first group are in the proportion of two parts of sodium metaphosphate and one part of sodium monoborate, and one part of dipotassium orthophosphate selected from the second group.

12. The method of cementing discrete pieces to produce built-up products, which comprises bonding said pieces into a preliminary built-up assembly with a bonding agent which is prepared by incorporating in a viscous colloidal aqueous association of at least one dissolved inorganic salt selected from a first group consisting of alkali metal metaphosphate, and alkali metal monoborate, the said association having the property of bonding said pieces and of spontaneously developing crystallization at increasingly elevated temperatures, said association comprising from about seventy-five percent to about twenty-five percent by weight of the bonding agent, and from about twenty-five percent to about seventy-five percent by weight of the bonding agent of at least one compatible compound selected from a second group consisting of potassium hydroxide, diammonium orthophosphate, and dipotassium orthophosphate, said compound having the property of restraining crystal development in said viscous colloidal association, and thereafter effecting the final bonding by subjecting the said built-up assembly to increasingly elevated temperatures until a desired degree of dehydration of the aqueous colloidal bonding agent has been attained and simultaneously to pressures sufficient to maintain the said bonding agent in a colloidal state, and cooling the finally bonded product while under pressure.

13. The method according to claim 12, in which the inorganic salts in said first group are sodium salts, and in which the assembly, during the final bonding operation, is subjected to controlled pressures from moderate pressures to upwards of about 250 pounds per square inch, and to controlled heat of from about 100° C. to upwards of about 500° C.

14. The method according to claim 12, in which the inorganic salts in said first group are sodium salts, and in which the assembly, during the final bonding operation, is subjected to controlled pressures of from about 150 pounds per square inch to about 215 pounds per square inch, and to controlled heat of from about 160° C. to about 170° C.

15. The method according to claim 12, in which the inorganic salts selected from the first group are in the proportion of two parts of sodium metaphosphate and one part of sodium monoborate, and one part of an orthophosphate selected from the second group.

16. The method according to claim 12, in which the inorganic salts selected from the first group are in the proportion of two parts of sodium metaphosphate and one part of sodium monoborate, and one part of dipotassium orthophosphate from the second group.

17. The method in accordance with claim 1, in which the discrete pieces are mica flakes, and the ultimate products are built-up mica products, and in which the assembly during the final bonding operation is subjected to controlled pressures from moderate pressures to selected pressures upwards to about 250 pounds per square inch, and to controlled heat of from about 100° C. to selected temperatures upwards to about 500° C.

18. The method according to claim 4, in which the discrete pieces are mica flakes, and the ultimate products are built-up mica products and in which the assembly during the final bonding operation is subjected to controlled pressures from moderate pressures to selected pressures upwards to about 250 pounds per square inch, and to controlled heat of from about 100° C. to selected temperatures upwards to about 500° C.

19. The method according to claim 7, in which the discrete pieces are mica flakes, and the ultimate products are built-up mica products, and in which the assembly during the final bonding operation is subjected to controlled pressures from moderate pressures to selected pressures upwards to about 250 pounds per square inch, and to controlled heat of from about 100° C. to selected temperatures upwards to about 500° C.

20. The method according to claim 12, in which the discrete pieces are mica flakes, and the ultimate products are built-up mica products, and in which the assembly during the final bonding operation is subjected to controlled pressures from moderate pressures to selected pressures upwards to about 250 pounds per square inch, and to controlled heat of from about 100° C. to selected temperatures upwards to about 500° C.

21. The method of maintaining in the colloidal state the bonding agent of a bonded product made up of discrete pieces preliminarily bonded with an inorganic viscous colloidal aqueous association having a tendency to devolop crystals, which comprises incorporating in said viscous colloidal aqueous association from about ten percent to about ninety percent by weight of the bonding agent of a compatible compound consisting of an inorganic crystallization restraining agent, and thereafter finally bonding said product by subjecting the same to controlled pressures from moderate pressures to selected pressures upwards to 250 pounds per square inch, and to controlled heat of from about 100° C. to selected temperatures upwards to about 500° C. until a desired degree of dehydration of the aqueous colloidal bonding agent has been attained, and thereafter cooling the bonded product while under pressure 22. The method of maintaining in the colloidal state the bonding agent of a bonded product made up of discrete pieces preliminarily bonded with an inorganic viscous colloidal aqueous association having a tendency to develop crystals, said association comprising at least one dissolved salt selected from a first group consisting of alkali metal metaphosphate and alkali metal monoborate, which comprises incorporating in said viscous colloidal aqueous association from about ten percent to about ninety percent by weight of the bonding agent of an inorganic crystallization restraining agent selected from a second group consisting of potassium hydroxide, diammonium orthophosphate, and dipotassium orthophosphate, and thereafter finally bonding said product by subjecting the same to controlled pressures from moderate pressures to selected pressures upwards to about 250 pounds per square inch, and to controlled heat of from about 100° C. to selected temperatures upwards to about 500° C. until a desired degree of dehydration of the aqueous colloidal bonding agent has been attained, and thereafter cooling the bonded product while under pressure.

23. The method according to claim 22, in which the discrete pieces are mica flakes, and the ultimate products are built-up mica products.

24. The method of preventing crystallization of colloidal binder components in an inorganic viscous colloidal aqueous association, which comprises adding to said aqueous association and dissolving therein from ten percent to upwards of ninety percent by weight of the said colloidal binder components of a compatible inorganic compound having the property of preventing the crystallization of the said dissolved colloidal binder components, confining limited quantities of said aqueous viscous colloidal association between surfaces and dehydrating said confined limited quantities to a desired degree by subjecting the same to temperatures upwards to 500° C. and simultaneously to pressures upwards to 250 pounds per square inch for a period of time sufficient to effect said dehydration and bond said surfaces, and thereafter cooling said bonded surfaces and bonding agent while under pressure.

25. The method of maintaining the aqueous viscous inorganic colloidal bonding agent of a built-up mica product bonded therewith free from crystal development, which comprises incorporating in said aqueous colloidal bonding agent from ten percent to upwards of ninety percent of a dissolved compatible inorganic compound having the property of preventing said crystal development, bonding mica flakes to produce said built-up mica product with limited quantities of said aqueous viscous inorganic colloidal bonding agent containing said dissolved compatible compound, dehydrating said limited quantities of said bonding agent to a desired degree by subjecting said mica flakes and bonding agent to temperatures upwards to 500° C. and simultaneously to pressures upwards to 250 pounds per square inch for a period of time sufficient to effect said dehydration and bond said mica flakes, and thereafter cooling said bonded mica product while under pressure.

WILLIS A. BOUGHTON.
WILLIAM R. MANSFIELD.